United States Patent [19]
Gautier

[11] Patent Number: 4,577,548
[45] Date of Patent: Mar. 25, 1986

[54] SERVOMOTOR FOR BRAKING ASSISTANCE

[75] Inventor: Jean P. Gautier, Aulnay Sous Bois, France

[73] Assignee: Societe Anonyme D.B.A., Paris, France

[21] Appl. No.: 701,895

[22] Filed: Feb. 15, 1985

[30] Foreign Application Priority Data

Feb. 22, 1984 [FR] France .............................. 84 02656

[51] Int. Cl.⁴ .............................................. F15B 9/10
[52] U.S. Cl. .................................. 91/369 A; 91/376 R
[58] Field of Search ............. 91/369 C, 369 A, 369 B, 91/369 R, 376 R; 60/547.1, 554

[56] References Cited

U.S. PATENT DOCUMENTS

| | | | |
|---|---|---|---|
| 2,832,316 | 4/1958 | Ingres | 91/369 B |
| 4,402,256 | 9/1983 | Ando | 91/369 C |
| 4,425,760 | 1/1984 | Furuta | 91/369 C |
| 4,487,105 | 12/1984 | Harrison | 91/369 C |

FOREIGN PATENT DOCUMENTS 2502567 10/1982 France .
2121898 1/1984 United Kingdom .

*Primary Examiner*—Paul E. Maslousky
*Attorney, Agent, or Firm*—Larry J. Palguta; Ken C. Decker

[57] ABSTRACT

The servomotor incorporates a component (50, 51) for retaining and positioning the plunger (12) forming the movable seat (11) for the valve mechanism (9) of the servomotor, the retaining component incorporating a cylindrical component (50) pivoting in the valve body (8) about an axis perpendicular to the direction of movement of the plunger (12), provided with a longitudinal groove (57) bounded by a first cam surface (58) cooperating with a shoulder (47) of the plunger (12) and a follower lever (51) outside the valve body (8) and incorporating a profiled edge (60) cooperating, on the return of the servomotor towards its rest position, with a ring (43) mounted in the neck (21) of the casing (1).

7 Claims, 3 Drawing Figures

FIG_1

SERVOMOTOR FOR BRAKING ASSISTANCE

The present invention concerns servomotors for braking assistance, particularly for motor vehicles, and more especially pneumatic servomotors of the type incorporating a casing, a piston structure dividing the casing internally into two chambers, a distribution valve means situated in a valve body firmly fixed centrally to the piston structure and actuated by an input component to create selectively a pressure differential between the chambers, the valve means incorporating a plunger mounted so as to slide in the valve body, joined to the input component and defining, at one of its ends, a movable valve seat, a fixed valve seat formed by the valve body, concentric with the movable valve seat, a valve means mounted in the valve body and elastically pushed towards the fixed and movable valve seats, a return spring bearing against the valve body and pushing the input component in the direction opposite to that of the fixed and movable valve seats, and a retaining component lying in the valve body and incorporating a first zone co-operating in contact engagement with a shoulder of the plunger and a second zone, outside the valve body, intended to co-operate in abutment with a stationary component firmly fixed to the casing in order to determine, in the configuration of the servomotor at rest, the rest position of the plunger.

Such a servomotor is described, for example, in British Patent No. GB-A-1,515,690, in which the retaining component consists of an internal extension of the sheet metal disc forming part of the piston structure, or in French Patent Application No. FR-A-2,480,692, in which the retaining component consists of a key carried by the piston structure or the plunger. In the latter case, the retaining component or key is designed so as to be able to move in translation along the general axis of the servomotor relative to the valve body in an arrangement which is not, however, able to ensure reliable and accurate displacement of the retaining component relative to the valve body, nor to avoid the risks of interference with the relative movement of the plunger or of the retaining component becoming skewed relative to the plunger and/or the valve body.

The aim of the present invention is to propose a novel arrangement of a servomotor of the type defined above, incorporating a retaining component associated with the valve body in such a way as to ensure reliable and accurate displacement of this retaining component relative to the valve body, thus ensuring positioning of the plunger which is accurate and also insensitive to the conditions of use of the servomotor, allowing, firstly, an optimum lift of the valve means during the period when braking is released, and secondly a reduced dead travel during the actuating stage, to be maintained permanently.

To achieve this, according to a characteristic of the invention, the retaining component is mounted in the valve body so as to pivot about an axis perpendicular to the direction of sliding of the plunger and incorporates a third zone intended, when the retaining component hinges about the said axis, to co-operate in abutment with a corresponding surface of the plunger in order to determine for the latter a maximum retractive position relative to the valve body under the effect of the return spring.

According to a more particular characteristic of the invention, the retaining component incorporates a cylindrical component which is co-axial with the said axis, incorporating a longitudinal groove bounded on one side by a first cam surface forming the said first zone, and at least one profiled follower lever firmly fixed to the cylindrical component and movable so as to hinge in a plane perpendicular to the said axis, outside the valve body, of which one edge forms the said second zone.

According to another particular characteristic of the invention, the valve body slides so as to be sealed in a central neck of the casing and an annular component is provided, mounted in this neck so as to form an abutment for the said edge of the follower lever of the retaining component.

Other characteristics and advantages of the present invention will emerge from the following description of an embodiment, given by way of illustration but not limiting in any way, with reference to the accompanying drawings, in which.

Figure 1:
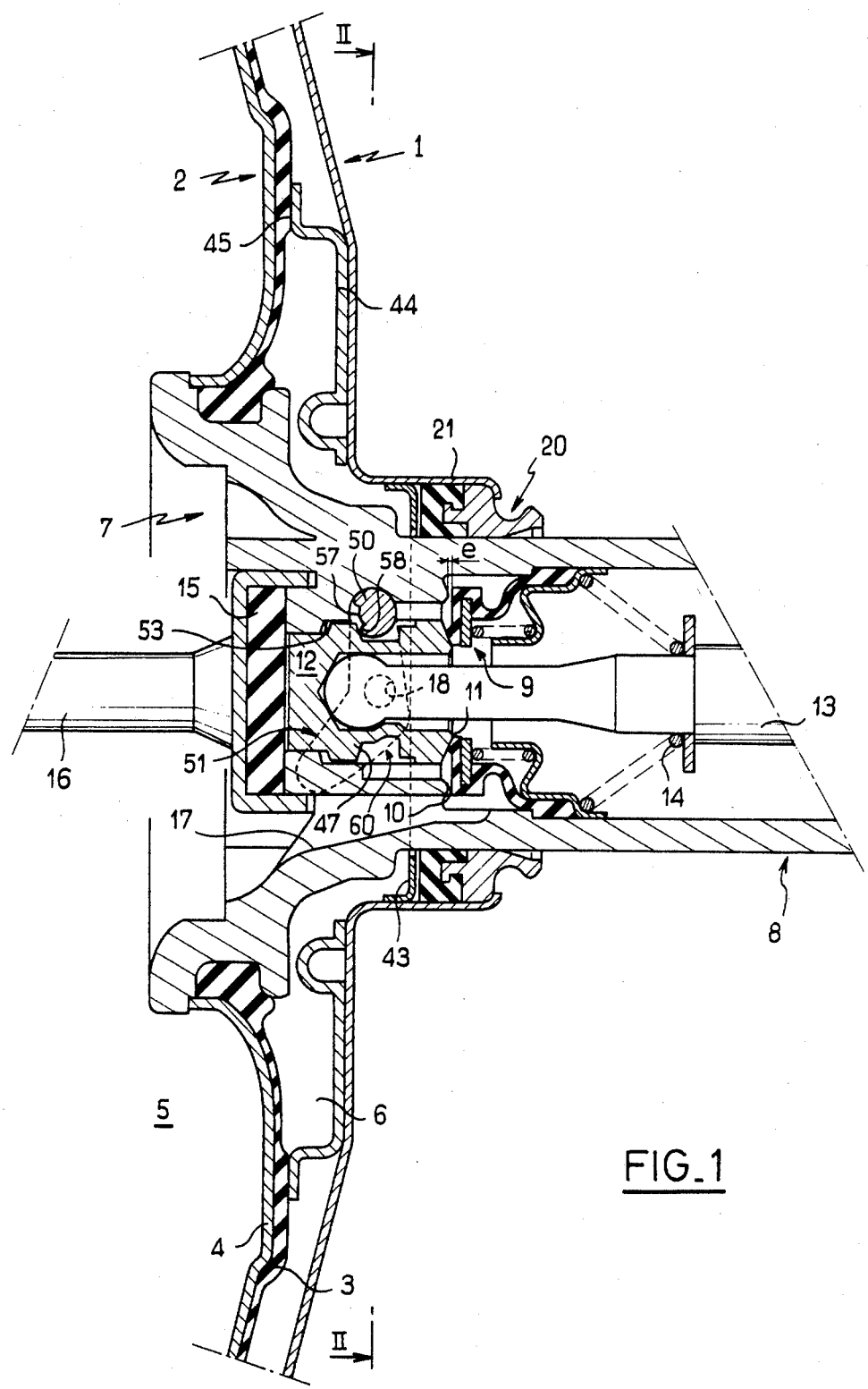
FIG. 1 is a partial view in longitudinal section of an assistance servomotor according to the invention.

The servomotor for braking assistance according to the invention, of the general type described in the documents mentioned above, incorporates a casing 1, (of which only the central portion of the rear shell is shown in the Figures) divided internally by a piston structure 2, consisting conventionally of a membrane 3, made of elastomeric material, and a support disc 4 made of metal, into two chambers, typically a front chamber 5 intended to be permanently joined to a source of vacuum, and a rear chamber or working chamber 6 intended to be joined selectively to the front chamber 5 or to the atmosphere by a distribution valve means, as will be seen further. The piston structure 2 is fixed centrally to a hub 7, typically made of plastic, extending towards the rear and towards the outside by a tubular valve body 8 sliding so as to be sealed through an assembly for guiding and for sealing 20 mounted in a rear tubular extension or neck 21 of the casing 1.

In the valve body 8 a valve means is mounted, elastically pushed, given the general reference 9, and intended to co-operate with a fixed valve seat 10 formed centrally in the valve body, and with a movable valve seat 11, advantageously in the shape of a frustum of a cone, formed at the rear end of a plunger 12 sliding in a central housing of the valve body and firmly fixed to an input and actuating rod 13 intended to be joined to a brake pedal of a motor vehicle (not shown). Also in a conventional manner, the rod 13 (and therefore the plunger (12)) is pushed towards the rear by a return spring 14 bearing against a shoulder of the rod 13 and against a shoulder inside the valve body 8, formed in this case by the mounting sleeve of the valve means 9. The plunger 12, at its opposite end from the rod 13, co-operates in thrust with a reaction disc made of elastomeric material 15 interposed between the plunger 12 and the output rod 16 of the servomotor intended to actuate the piston of a master cylinder associated with the servomotor. In the rest position of the servomotor shown in FIG. 1, the valve means 9 bears against the movable valve seat 11 and is separated by the latter from the fixed valve seat 10 by a distance e, thus allowing communication between the chambers 5 and 6 through longitudinal passages 17 and through radial passages 18, diametrically opposed as shown clearly in FIG. 2, formed in the hub 7/valve body 8 assembly. In operation, when the rod 13 is depressed to the left to initiate a period of braking, the valve means 9 comes to bear against the fixed valve seat 10 while continuing to bear against the movable valve seat 11, thus interrupting communication between the two chambers 5 and 6. Additional displacement of the rod 13 in the same direction then separates the movable valve seat 11 from the valve means 9 (held bearing against the fixed valve seat 10) so as to admit atmospheric air in a controlled manner into the rear chamber 6, the air coming from outside through the internal passage formed in the tubular valve body 8. An important characteristic of this type of servomotor lies in the dead actuating travel represented by the clearance e existing at rest between the valve means 9 and the fixed valve seat 10. It will be understood that, the valve means 9 being elastically pushed in the direction of the movable seat 11 and the fixed seat 10, this clearance e is determined by the position at rest of the plunger 12 relative to the valve body 8, which must itself, together with the piston structure 2, be positioned in a configuration at rest relative to the casing 1, fixed to a stationary structure of the vehicle.

Figure 2:
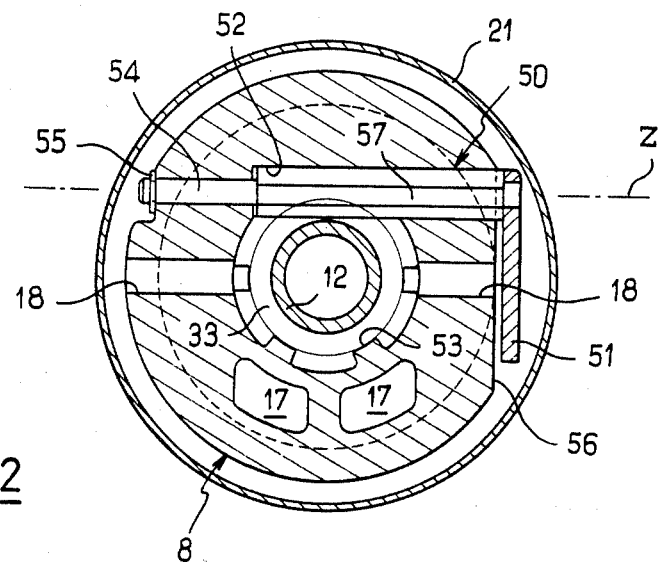
FIG. 2 is a view in transverse section along the section line II—II shown in FIG. 1.

In accordance with the invention, the positioning of the plunger 12 is provided by a retaining component incorporating, as is more clearly seen in FIG. 2, a cylindrical shaft component 50 and at least one follower lever 51. The cylindrical component 50 is mounted so as to rotate in a stepped bore 52 formed in the valve body 8, with an axis Z perpendicular to the direction of sliding of the plunger 12, the main portion of the bore 52, of larger diameter, intersecting the central bore 53 in which the plunger 12 slides. The main portion of the cylindrical component 50 is extended by a shaft component of smaller diameter 54 projecting outside the bore 52 and provided with a washer 55 for preventing movement in translation. In contrast to this washer 55, the main portion of the cylindrical component 50 is firmly fixed to a follower lever 51 situated outside the valve body 8, inside the inscribed circle of the neck 21 and able to pivot in a plane perpendicular to the axis Z in the region of an external flat 56 cut on the valve body 8.

The plunger 12 is provided with a peripheral groove 33, bounded towards the front by an oblique shoulder 47. With the general arrangement described above, the main portion of the cylindrical component 50 partly enters into the annular groove 33 of the plunger 12 and, at least in this region, the cylindrical component 50 is provided with a longitudinal groove 57 bounded longitudinally on one side by a first cam surface 58, and on the other side, by a second cam surface 59. The follower lever 51 has the general shape of a boomerang and overhangs relative to the cylindrical component 50, the convex edge 60 of the boomerang having a rounded tapered profile forming a cam and intended to co-operate with an abutment surface formed by a collar 43 mounted in the neck 21 in front of the guiding and sealing assembly 20.

Figure 3:
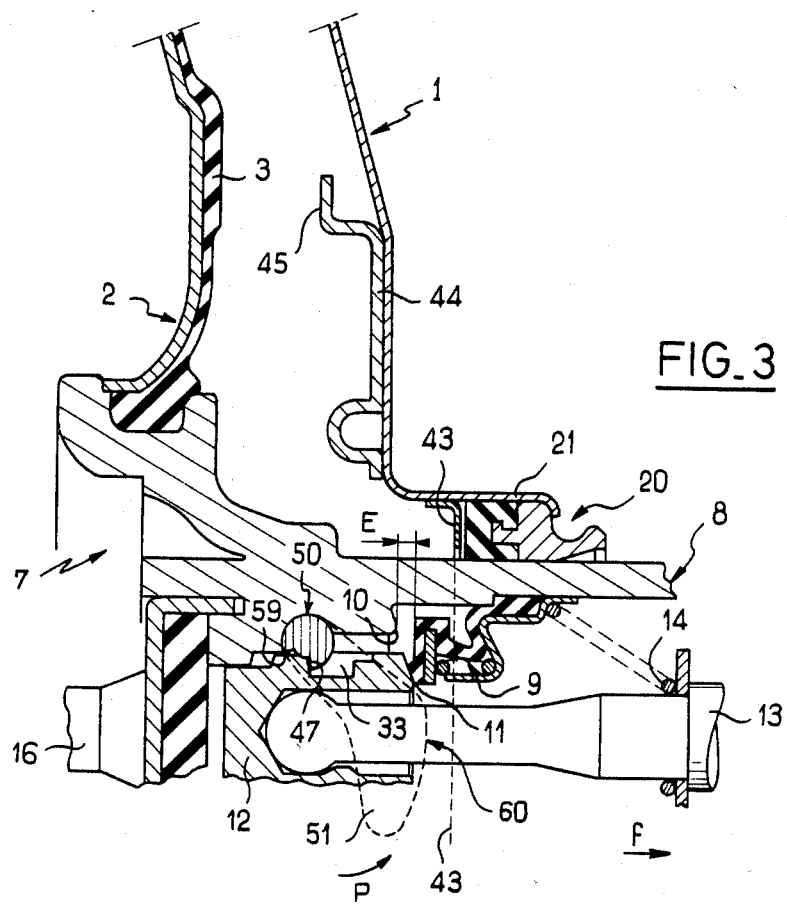
FIG. 3 is as partial view, similar to that of FIG. 1, showing the arrangement of the component parts of the valve means at the start of a return phase corresponding to release of the braking pressure.

In the rest position of the servomotor shown in FIG. 1, the piston structure 2 bears against the casing 1, for example against an abutment surface 45 formed by an annular reinforcement 44 fixed internally to the rear wall of the casing 1, around the valve body 8. The follower lever 51 bears, essentially in the region of the elbow of the edge 60, against the collar 43. In this configuration, the shoulder 47 of the annular groove 33 of the plunger 12 bears against the first cam surface 58 of the cylindrical component 50, thus determining accurately the clearance e or dead actuating travel of the valve means 9. When the rod 13 is driven inwards in a period of braking, the plunger 12 is displaced forwards, bearing against the disc 15, the axial width of the groove 33 allowing the cylindrical component 50 to disengage from the shoulder 47. The retaining component 50, 51 then follows the displacement of the hub 7/valve body 8 assembly. When, starting from such a braking configuration, the force exerted on the rod 13 is released, the latter, under the effect of the return spring 14, move towards the rear in the direction of the arrow f shown in FIG. 3, thus causing a relative displacement of the plunger 12 towards the rear, relative to the valve body 8. As this takes place, the shoulder 47 of the groove 33 comes to bear against the first cam surface 58 of the groove 57 and also forces this cam surface to move towards the rear, which results in rotation towards the rear, in the direction of the arrow P shown in FIG. 3, of the retaining component 50, 51. This hinging movement of the retaining component, and therefore the retraction of the plunger 12 in the direction of the arrow f, is limited by the second cam surface 59 of the groove 57 coming to bear against the peripheral wall of the plunger 12 in the region of the shoulder 47. In the configuration thus obtained, and shown in FIG. 3, an extra wide opening E of the valve means 9 is obtained, forced towards the rear by the plunger 12, relative to the fixed valve seat 10, permitting rapid depressurization of the rear working chamber 6 of the servomotor so as to enable the latter to regain rapidly an equilibrium position. If the force on the rod is completely released, the piston structure 2/hub 7/valve body 8/plunger 12/rod 13 assembly is returned towards the rest position shown in FIG. 1, that is to say that starting from the configuration shown in FIG. 3 maintained until now, the edge 60 of the lever 51 comes to bear and to roll against the collar 43 so as to cause the retaining component 50, 51 to pivot in the direction opposite to that of the arrow P until the rest position shown in FIG. 1 is regained. During this reverse hinging movement of the retaining component, the first cam surface 58 pushes back the plunger 12, via its shoulder 47, towards the front, against the return force of the spring 14, disengaging the second cam surface 59 from the periphery of the plunger 12 so as to bring the lift of the valve means 9 relative to the fixed valve seat 10 from the extra wide opening value E to the reduced value e which can be determined accurately because the chain of dimensions can also be reduced. It will be noted in this regard that the mounting position required for the collar 43 may be determined, possibly adjusted slightly, with great accuracy.

It will also be noted that the retaining component may incorporate a second follower lever mounted, for example, on the end of the shaft 54 and fixed angularly relative to the latter so as to duplicate exactly the first follower lever 51, the valve body 8 being provided, in this case, with a second flat cut parallel to the first flat 56. This flat may also be provided with an abutment for the lever 51 limiting its swing in the direction opposite to that of the arrow P in such a way that the retaining component also forms an abutment for the piston 2/hub 7 assembly instead of the abutment 45 of the casing.

I claim:
1. A servomotor for braking assistance incorporating:
a casing, a piston structure dividing the casing internally into two chambers, distribution valve means situated in a valve body firmly fixed centrally to the piston structure and actuated by an input component to create selectively a differential pressure between the chambers, the valve means incorporating:

a plunger mounted so as to slide in the valve body, joined to the input component and defining at one of its ends a movable valve seat, a valve body seat formed in the valve body, concentric with the movable valve seat, valve means mounted in the valve body and elastically pushed towards the valve body seat and movable valve seat, a return spring bearing against the valve body and pushing the input component in the direction opposite to that of the valve body seat and movable valve seat, and a retaining component lying in the valve body and incorporating a first zone co-operating in contact engagement with a shoulder of the plunger and a second zone, outside the valve body, intended to co-operate in abutment with a stationary component firmly fixed to the casing in order to determine, in the configuration of the servomotor at rest, the rest position of the plunger, characterized in that the retaining component is mounted in the valve body so as to pivot about an axis perpendicular to the direction of sliding of the plunger and incorporates a third zone intended, during hinging of the retaining component about the said axis, to co-operate in abutment with a corresponding surface of the plunger in order to determine for the latter a position of maximum retraction relative to the valve body under the effect of the return spring.

2. The servomotor according to claim 1, characterized in that the retaining component incorporates a cylindrical component co-axial with the axis incorporating a longitudinal groove bounded on one side by a first cam surface forming the first zone, and at least one profiled follower lever firmly fixed to the cylindrical component and movable so as to hinge in a plane perpendicular to the axis, outside the valve body, of which one edge forms the second zone.

3. The servomotor according to claim 2, characterized in that the cylindrical component partially enters into a peripheral groove of the plunger forming the shoulder, the groove being bounded, on the other side, by a second cam surface capable of coming to bear against the peripheral surface of the plunger in the region of the shoulder and forming the said third zone.

4. The servomotor according to claim 3, in which the valve body slides so as to be sealed in a central neck of the casing, and the servomotor incorporates an annular component mounted in the neck and forming an abutment for the edge of the follower lever.

5. The servomotor according to claim 4, characterized in that the edge has a rounded profile.

6. The servomotor according to claim 2, characterized in that the cylindrical component is mounted in a transverse stepped bore in the valve body and is extended by a shaft component of smaller diameter and provided at its end with a component for preventing movement in translation.

7. The servomotor according to claim 1, characterized in that the casing incorporates an annular internal reinforcement surrounding the valve body and forming an abutment surface for the piston structure.

* * * * *